US008639028B2

(12) United States Patent
Spaeth et al.

(10) Patent No.: US 8,639,028 B2
(45) Date of Patent: Jan. 28, 2014

(54) AUTOMATIC STACKING BASED ON TIME PROXIMITY AND VISUAL SIMILARITY

(75) Inventors: Radford Spaeth, Santa Rosa, CA (US); Michael Slater, Sebastopol, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1617 days.

(21) Appl. No.: 11/394,804

(22) Filed: Mar. 30, 2006

(65) Prior Publication Data

US 2013/0125002 A1  May 16, 2013

(51) Int. Cl.
*G06K 9/00* (2006.01)
(52) U.S. Cl.
USPC ........... 382/165; 715/731; 382/100; 382/107; 382/224; 382/225
(58) Field of Classification Search
USPC ......... 382/165, 224–227; 707/104.1; 345/581
See application file for complete search history.

(56) References Cited

U.S. PATENT DOCUMENTS

| | | | | |
|---|---|---|---|---|
| 5,675,358 A * | 10/1997 | Bullock et al. | ................. | 345/420 |
| 6,282,317 B1 * | 8/2001 | Luo et al. | ...................... | 382/203 |
| 6,538,698 B1 * | 3/2003 | Anderson | ................ | 348/333.05 |
| 6,580,437 B1 * | 6/2003 | Liou et al. | ..................... | 715/719 |
| 6,745,186 B1 * | 6/2004 | Testa et al. | ......................... | 707/7 |
| 6,819,783 B2 * | 11/2004 | Goldberg et al. | ............. | 382/115 |
| 6,834,122 B2 * | 12/2004 | Yang et al. | ..................... | 382/227 |
| 6,915,011 B2 * | 7/2005 | Loui et al. | ..................... | 382/224 |
| 6,928,233 B1 * | 8/2005 | Walker et al. | ................. | 386/241 |
| 6,950,533 B2 * | 9/2005 | Zlotnick | ....................... | 382/100 |
| 6,956,573 B1 * | 10/2005 | Bergen et al. | ................ | 345/473 |
| 7,437,005 B2 * | 10/2008 | Drucker et al. | ............... | 382/224 |
| 7,694,236 B2 * | 4/2010 | Gusmorino et al. | .......... | 715/838 |
| 7,831,599 B2 * | 11/2010 | Das et al. | ...................... | 707/737 |
| 8,326,087 B2 * | 12/2012 | Perronnin et al. | ............ | 382/294 |
| 8,385,663 B2 * | 2/2013 | Xu et al. | ....................... | 382/225 |
| 2002/0001404 A1 * | 1/2002 | Yoshikawa et al. | ........... | 382/145 |
| 2002/0009286 A1 * | 1/2002 | Kasutani | ......................... | 386/46 |
| 2002/0075322 A1 * | 6/2002 | Rosenzweig et al. | ......... | 345/835 |
| 2002/0168108 A1 * | 11/2002 | Loui et al. | ..................... | 382/190 |
| 2003/0026507 A1 | 2/2003 | Zlotnick | | |
| 2003/0059107 A1 * | 3/2003 | Sun et al. | ...................... | 382/165 |
| 2003/0072486 A1 * | 4/2003 | Loui et al. | ..................... | 382/175 |
| 2003/0084065 A1 * | 5/2003 | Lin et al. | .................... | 707/104.1 |

(Continued)

FOREIGN PATENT DOCUMENTS

| | | | | |
|---|---|---|---|---|
| EP | 1246085 A2 * | 10/2002 | ............. | G06F 17/30 |
| EP | 1369792 A2 * | 12/2003 | ............. | G06F 17/30 |

OTHER PUBLICATIONS

Yong Rui Huang, T.S. Mehrotra, S., "Exploring video structure beyond the shots", Jun. 28, 1998, "Multimedia Computing and Systems, 1998. Proceedings. IEEE International Conference on", p. 1-4.*

(Continued)

*Primary Examiner* — Jason M. Repko
*Assistant Examiner* — Gandhi Thirugnanam
(74) *Attorney, Agent, or Firm* — Wolfe-SMBC

(57) ABSTRACT

Automatic stacking based on time proximity and visual similarity is described, including a method, comprising analyzing a time proximity of a plurality of electronic images, performing a visual similarity analysis on the plurality of electronic images, and stacking the plurality of electronic images based on a result of the time proximity analysis and the visual similarity analysis.

20 Claims, 11 Drawing Sheets

(56) References Cited

U.S. PATENT DOCUMENTS

| | | | |
|---|---|---|---|
| 2003/0123713 A1* | 7/2003 | Geng | 382/118 |
| 2003/0123737 A1* | 7/2003 | Mojsilovic et al. | 382/224 |
| 2003/0145279 A1* | 7/2003 | Bourbakis et al. | 715/511 |
| 2003/0152363 A1* | 8/2003 | Jeannin et al. | 386/68 |
| 2003/0184653 A1* | 10/2003 | Ohkubo | 348/207.1 |
| 2003/0189602 A1* | 10/2003 | Dalton et al. | 345/830 |
| 2003/0195883 A1* | 10/2003 | Mojsilovic et al. | 707/6 |
| 2003/0206668 A1* | 11/2003 | Nakajima et al. | 382/305 |
| 2003/0227468 A1* | 12/2003 | Takeda | 345/619 |
| 2004/0001631 A1* | 1/2004 | Camara et al. | 382/224 |
| 2004/0208365 A1* | 10/2004 | Loui et al. | 382/171 |
| 2004/0228504 A1* | 11/2004 | Chang | 382/118 |
| 2005/0004690 A1* | 1/2005 | Zhang et al. | 700/94 |
| 2005/0163378 A1* | 7/2005 | Chen | 382/190 |
| 2005/0283742 A1* | 12/2005 | Gusmorino et al. | 715/839 |
| 2006/0026524 A1* | 2/2006 | Ma et al. | 715/713 |
| 2006/0071942 A1* | 4/2006 | Ubillos et al. | 345/619 |
| 2006/0071947 A1* | 4/2006 | Ubillos et al. | 345/648 |
| 2006/0106816 A1* | 5/2006 | Oisel et al. | 707/100 |
| 2006/0195475 A1* | 8/2006 | Logan et al. | 707/104.1 |
| 2006/0214953 A1* | 9/2006 | Crew et al. | 345/660 |
| 2006/0220986 A1* | 10/2006 | Takabe et al. | 345/9 |
| 2007/0035551 A1* | 2/2007 | Ubillos | 345/581 |
| 2007/0088748 A1* | 4/2007 | Matsuzaki et al. | 707/104.1 |
| 2007/0201558 A1* | 8/2007 | Xu et al. | 375/240.22 |
| 2007/0226255 A1* | 9/2007 | Anderson | 707/104.1 |
| 2008/0205772 A1* | 8/2008 | Blose et al. | 382/225 |
| 2009/0123021 A1* | 5/2009 | Jung et al. | 382/100 |
| 2009/0150376 A1* | 6/2009 | O'Callaghan et al. | 707/5 |
| 2009/0161962 A1* | 6/2009 | Gallagher et al. | 382/203 |
| 2009/0220159 A1* | 9/2009 | Tanaka et al. | 382/203 |
| 2009/0313267 A1* | 12/2009 | Girgensohn et al. | 707/100 |
| 2010/0128919 A1* | 5/2010 | Perronnin et al. | 382/100 |
| 2010/0172551 A1* | 7/2010 | Gilley et al. | 382/118 |
| 2011/0064317 A1* | 3/2011 | Ubillos | 382/218 |
| 2012/0082378 A1* | 4/2012 | Peters et al. | 382/165 |
| 2012/0328190 A1* | 12/2012 | Bercovich et al. | 382/165 |
| 2013/0121590 A1* | 5/2013 | Yamanaka et al. | 382/195 |
| 2013/0125002 A1* | 5/2013 | Spaeth et al. | 715/731 |

OTHER PUBLICATIONS

Graham, Adrian, Garcia-Molina, Hector, Paepcke, Andreas, Winograd, Terry, "Time as essence for photo browsing through personal digital libraries",2002, Proceedings of the 2nd ACM/IEEE-CS joint conference on Digital libraries, p. 326-335.*

Rodden, Kerry, "How do people manage their digital photographs", 2003, ACM Press, p. 409-416.*

Platt, John C. "AutoAlbum: Clustering Digital Photographs using Probablistic Model Merging", "http://research.microsoft.com/pubs/68971/cbaivl.pdf", p. 1-6.*

Cooper et al., "Temporal Event Clustering for Digital Photo Collections", Aug. 2005, ACM Transactions on Multimedia Computing, Communications and Applications, vol. 1, No. 3, p. 269-288.*

Loui, A. and Savakis, A. 2003. Automatic event clustering and quality screening of comsumer pictures for digital albuming. IEEE Trans. Multimed. 5, 3, p. 390-402.*

J. Platt, et al, "PhotoTOC: Automatic Clustering for Browsing Personal Photographs", 2002, http://research.microsoft.com/en-us/um/people/jplatt/PhotoToC-pacrim.pdf, p. 1-5.*

Platt, John C. "AutoAlbum: Clustering Digital Photographs using Probablistic Model Merging", Jun. 2000, http://research.microsoft.com/pubs/68971/cbaivl.pdf, p. 1-6.*

* cited by examiner

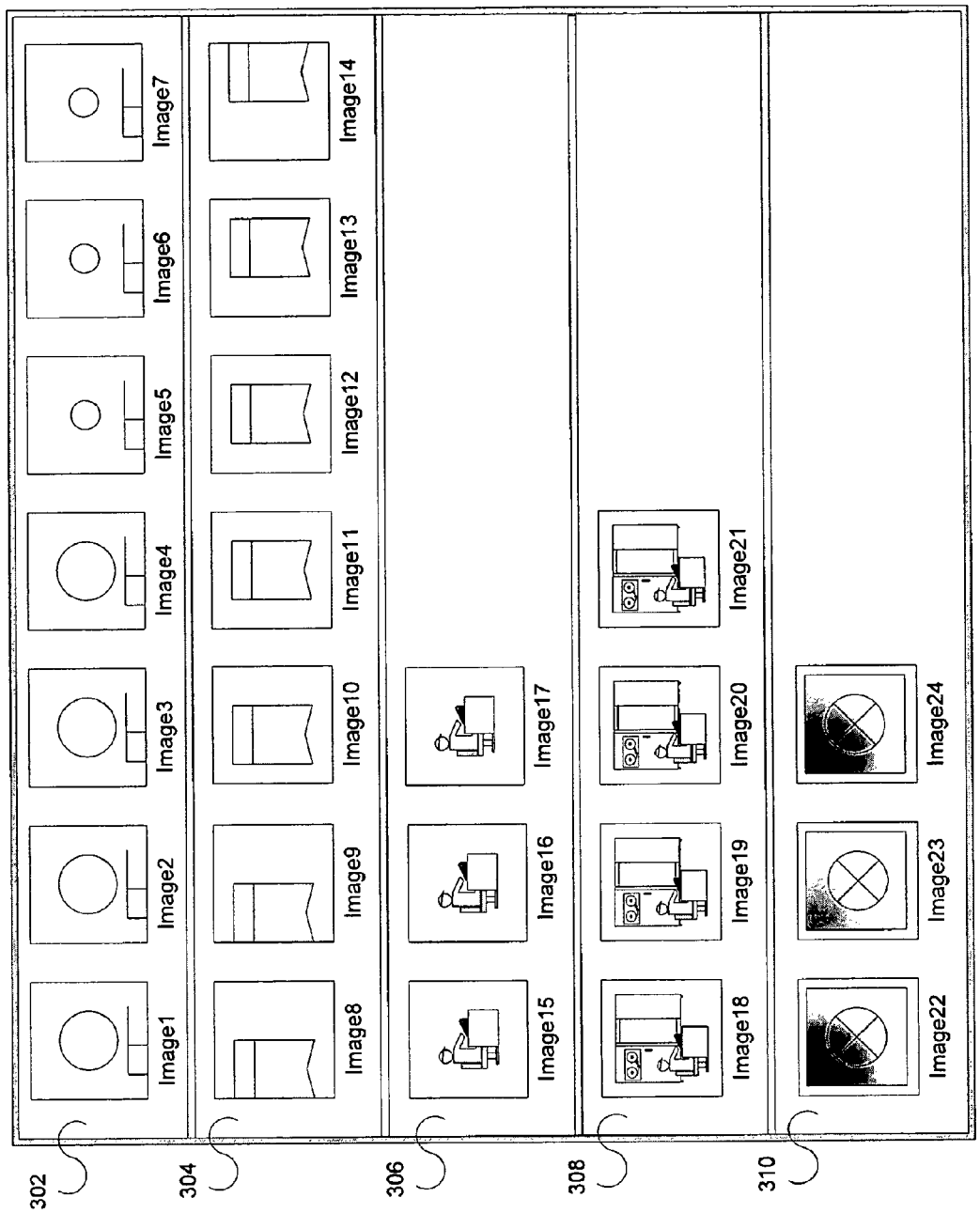

AUTOMATIC STACKING BASED ON TIME PROXIMITY AND VISUAL SIMILARITY

FIELD OF THE INVENTION

The present invention relates generally to software. More specifically, a method and system for stacking images is described.

BACKGROUND OF THE INVENTION

The advances of conventional digital camera technology have made the process of capturing images easier. However, capturing a good quality image is difficult and problematic using conventional techniques. To work around this problem, many users capture the same image multiple times with the expectation that one of the images may be useable for printing or assembly in a slide show. For example, a feature referred to as "burst mode" or "continuous shooting mode," may allow a digital camera to take a sequence of images in rapid succession. Some digital camera models allow for an unlimited number of image captures, while other models limit the number of successive images to a single burst.

Capturing multiple images may contribute to image window clutter and unmanageability. In some conventional applications, users can group images in folders or files, such as the filing system in an operating system of a computer. Users may be required to manually select the images, drag them to a folder, and drop them in. This may be very tedious for an avid photographer. Even after the tedious organizational effort, the generic filing systems of operating systems may require the user to locate and select one particular image for printing, viewing, or copying functions.

Image-based applications may provide the concept of a "stack" which may provide a way to group images with some added benefits. The "stack" of images may be treated as if it were one image. That is, one thumbnail image is shown in a display window as a representation of the stack. The other images in the stack are stored and available, but may not have a visible thumbnail. Further, the image selected as the thumbnail may be automatically pre-selected for printing, or viewing. However, similarly to files or folders, users may be required to manually select the images in the stack, which may be tedious and time consuming.

Some applications provide for the grouping of images based on time proximity. That is, the images captured during a selected time interval may be grouped together. However, this method may group images together that have no subject matter commonality. In other words, images taken during a selected time interval may be visually different or disparate. For example, a user may be on a whale watching trip and capture images of a whale breaching when a sea bird passes between the lens and the whale. These images may be grouped by time proximity analysis simply because they were captured during the same time range. Other applications provide for the grouping of images based on visual similarity. That is, the images that share common scenery or common images are grouped together. However, this method may group differing views of the same subject captured years apart that a user may want to keep separate.

Thus, what is needed is a method and system for stacking images without the limitations of conventional techniques.

BRIEF DESCRIPTION OF THE DRAWINGS

Various embodiments of the invention are disclosed in the following detailed description and the accompanying drawings:

FIG. 3A illustrates an exemplary user interface displaying image groupings formed during the grouping process;

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Techniques for stacking images are described, including receiving a plurality of electronic images, determining one or more groupings for the plurality of electronic images based on a time proximity and a visual similarity, and creating one or more stacks for the plurality of electronic images based on one or more of the groupings. A system for stacking digital images is also described, including a visual similarity engine that may be configured to assess a visual similarity between digital images, a time analyzer configured to analyze a time proximity between digital images, a grouping module configured to group digital images in one or more groups based on the visual similarity and the time proximity, and a user interface configured to display the groups of digital images.

Figure 1:
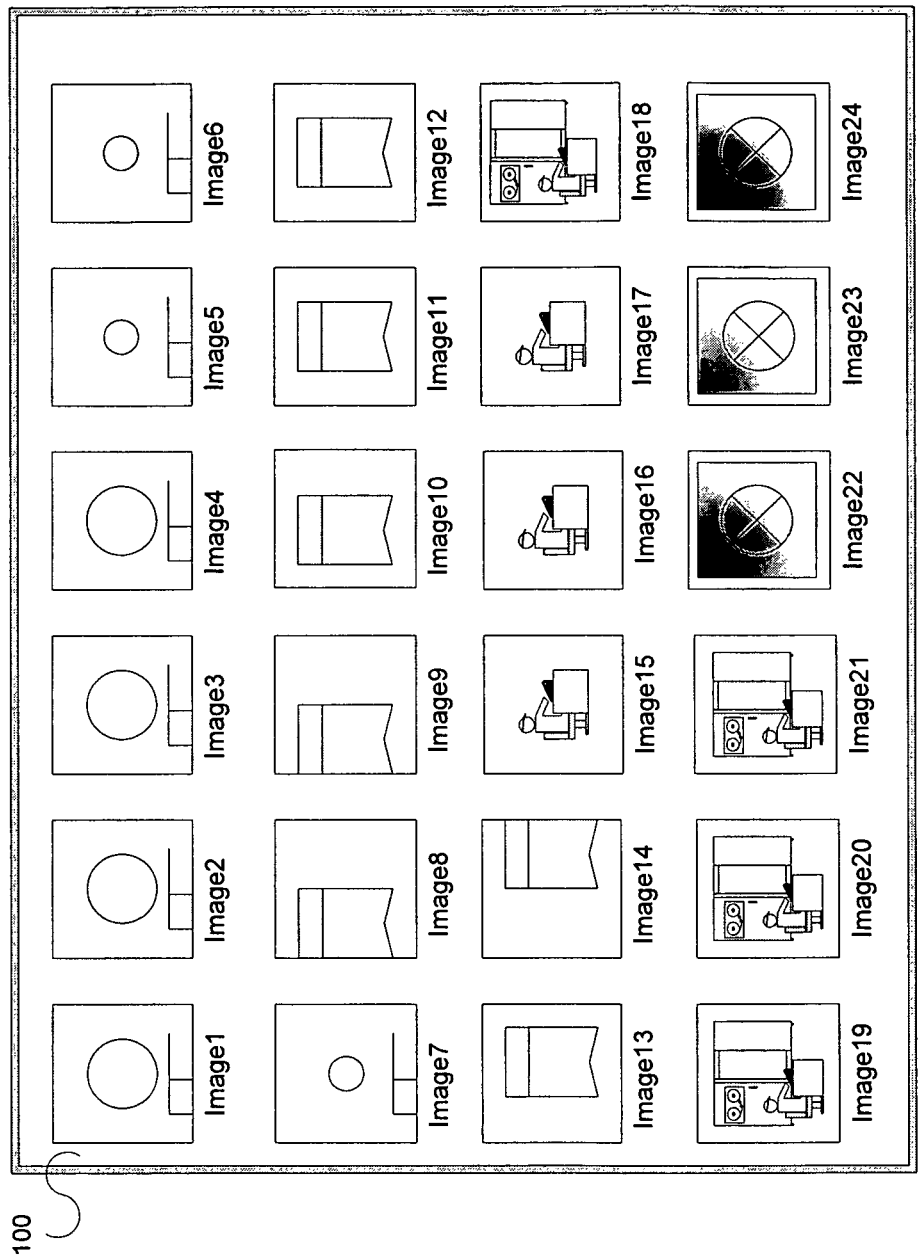
FIG. 1 illustrates an exemplary display window displaying representations of image files.

FIG. 1 illustrates an exemplary display window 100 displaying representations of image files. Display window 100 may be referred to as window, display, display space, screen, page, panel, pane, sheet, tab, or similar terms. Display window 100 may also be referred to as user interface, graphical user interface (GUI), visual interface, interface, or the like. Representations of image files may include icons, thumbnails, and text. The representations may differ in size, complexity, and information detail. Thumbnails may reflect the image of the file which it represents. That is, thumbnails may be a smaller copy of the image in the image file. Icons may be a graphic that indicates the type of file or the product used to create or view the file. For example, an icon consisting of a graphic of a piece of paper with writing may indicate a document file. Image files may be referred to as digital image files, digital images, images, digital photographs, electronic images, graphics, and graphic images. Image files may exist in many formats that may be categorized as a raster-based format or a meta/vector graphic based format.

In some examples, raster formats may be based on picture elements, or pixels. A display space or image may be divided up into thousands or millions of pixels. The pixels may be arranged in rows and columns and may be referred to as colored dots. Raster formats differ in the number of bits used per pixel and the compression technique used in storage. One bit per pixel can store black and white images. For example, a bit value of 0 may indicate a black pixel, and a bit value of 1 may indicate a white pixel. As the number of bits per pixel increase, the number of colors a pixel can represent may increase. Example raster formats for image files may include: Graphic Interchange Format (GIF), Joint Photographers Experts Group (JPEG), and Microsoft Windows™ Bitmap (Bitmap). Additional raster formats for image files may include: Windows® Clip Art (CLP), Soft Paintbrush™ (DCX), OS/2™ Warp Format (DIB), Kodak FlashPix™ (FPX), GEM Paint™ Format (IMG), JPEG Related Image Format (JIF), MacPaint™ (MAC), MacPaint™ New Version (MSP), Macintosh™ PICT Format (PCT), ZSoft Paintbrush™ (PCX), Portable Pixel Map by UNIX™ (PPM), Paint Shop Pro™ format (PSP), Unencoded image format (RAW), Run-Length Encoded (RLE), Tagged Image File Format (TIFF), and WordPerfect™ Image Format (WPG).

Vector formats are not based on pixels, but on vectors of data stored in mathematical formats, which may allow for curve shaping and improved stability over raster images. Some example meta/vector image formats may include: CorelDraw™ (CDR), Hewlett-Packard Graphics Language (HGL), Hewlett-Packard Plotter Language (GL/2), Windows™ Metafile (EMF or WMF), Encapsulated PostScript (EPS), Computer Graphics Metafile (CGM) Flash™ Animation, Scalable Vector Graphics (SVG), and Macintosh™ graphic file format (PICT).

Thumbnails image 1 through image 24 in FIG. 1 may have resulted from one or more image capturing sessions. An image capturing session may be the duration of time from one download of images from an image capturing device to a computer to the subsequent download. Image capturing devices may include a digital camera, a cell phone, and a personal digital assistant. For example, the images downloaded from a digital camera may be considered images from one image capturing session. Thumbnails image 1 through image 7 may represent separate image captures of the same scene with thumbnails image 1 through image 4 representing a closer image and thumbnails image 5 through image 7 representing an image farther away. Thumbnails image 8 through image 14 may represent images of an object. Thumbnails image 15 through image 17 may represent images of a person in a scene, and thumbnails image 18 through image 24 may represent images of the person in a slightly different scene. Thumbnails image 22 through image 24 may represent images with varying degrees of exposure.

Display window 100 may be a user interface in a file management application such as a digital image management application, a web page, or other application. Although display window 100 displays thumbnails image 1 through image 24, some other embodiments may include many more images to be managed. Management of images may include creating stacks, selecting stacks for slide shows and/or printing, and the like.

In some embodiments, creating a stack refers to the grouping of image files in a common holder represented by a single thumbnail. The stack may preserve the plurality of images without cluttering up the display window or user interface with multiple thumbnails. The image chosen as the stack representative may be printed or used in a slide show by selecting the stack. That is, upon selecting the stack, the representative image is automatically selected.

Figure 2A:
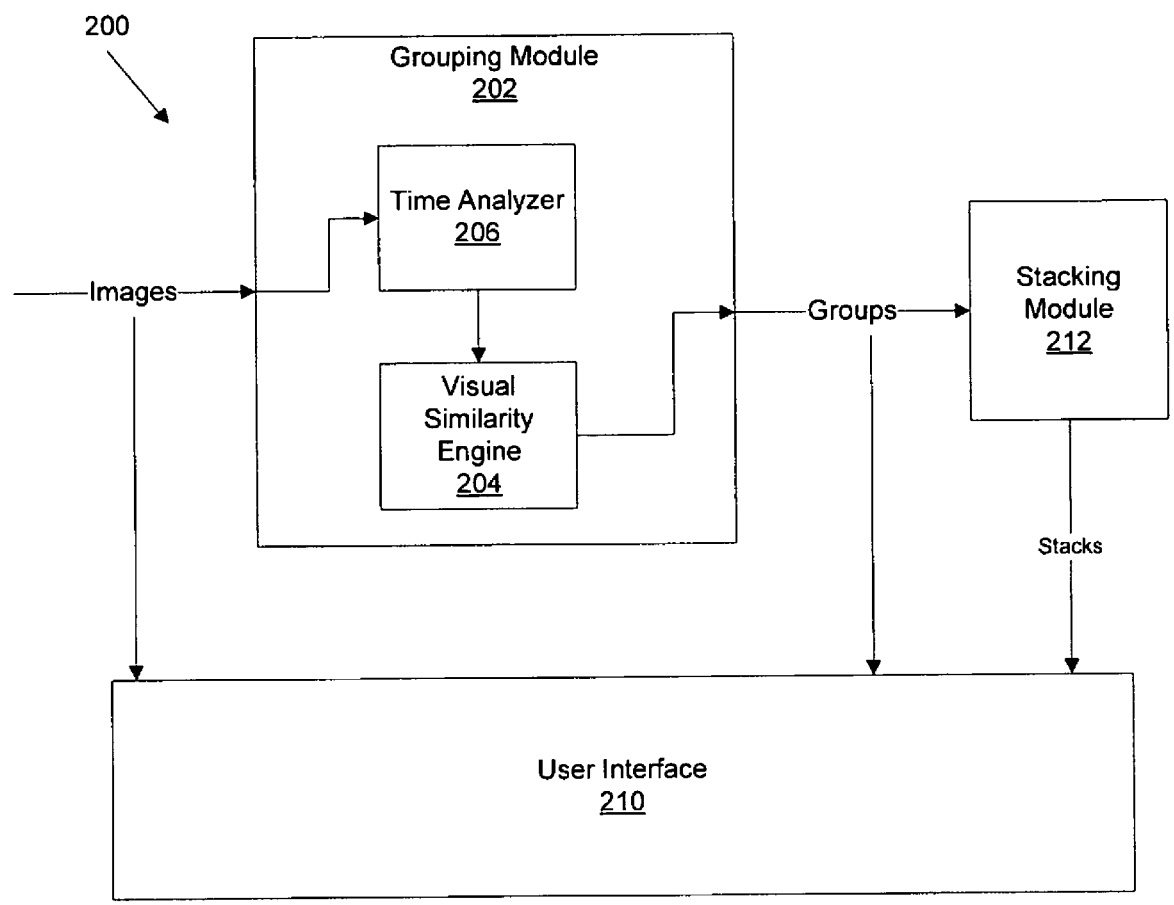
FIG. 2A illustrates an exemplary system for stacking images.

FIG. 2A illustrates an exemplary system 200 for stacking images. In some embodiments, system 200 may include grouping module 202, user interface 210, and stacking module 212. A plurality of image files may be input into grouping module 202. The image files may include graphics, digital photos, or other electronic images, and may be represented by thumbnails, icons, or text in a display window or application window in user interface 210. An input may refer to any command or data entered into a computing device. Here, the images may be input into grouping module 202 by the selection of a window control element such as a button or menu item. Grouping module 202 may automatically select the image files represented by the thumbnails in the display window in user interface 210. That is, the electronic image files being displayed at the time a control button is selected may be automatically selected without having the user click on or highlight an image file thumbnail. In some embodiments, the input of the images occurs upon the download from an image capturing device, such as a digital camera. That is, the image files being downloaded from a digital camera during or after selection of a window control element may be automatically selected for input into grouping module 202. In some embodiments, downloading from an image capturing device acts as the trigger for selection (i.e., no window control element is selected). In some embodiments, user interface 210 may be a component in a file management application, such as a digital image management application. In some embodiments, user interface 210 may be a web browser, or other application. Grouping module 202 may sort the image files. Sorting may refer to grouping, dividing, collecting, classifying, placing, or categorizing the images into groups or collections. That is, the plurality of images is divided into groups. In some examples, a group or collection may include one or more electronic image files.

In some embodiments, grouping module 202 may include time analyzer 206. In some embodiments, time analyzer 206 may analyze the plurality of images for time proximity. Here, time proximity may include the measure of the difference between the time stamps of two or more images and the comparison of the difference to a time range. Time analyzer 206 may include a time range such that images which have a time stamps that fall within the time range may be considered to have time proximity. In some embodiments, the time range may be set via user interface 210. In some embodiments, when two or more images posses time proximity and at least a low to medium visual similarity they may be grouped together by grouping module 202.

In some embodiments, grouping module may include visual similarity engine 204. Visual similarity engine 204 may perform visual simulation analysis. That is, visual similarity engine 204 may analyze the plurality of images input into grouping module 202 to determine if they are visually similar. In some embodiments, visual similarity may be the measure of the degree of similarity between two or more images. Here, visual similarity may refer to having a likeness such that the images capture the same scene. In some embodiments, visual similarity engine may select nodal points in an image for correlation to nodal points in another image. Visual similarity engine 204 may include a threshold value used as the measure beyond which visual similarity may be achieved. In some embodiments, visual similarity engine 204 may include more than one threshold value (e.g., minimum/low and maximum/high thresholds or low, medium, and high thresholds) such that the high threshold is greater than the medium threshold and the medium threshold is greater than the low threshold. Multiple threshold values may allow various levels of visual similarity to be determined. For example, if low, medium, and high visual similarity thresholds are set, the various levels of visual similarity may include low visual similarity, medium visual similarity, and high visual similarity. In some embodiments, the threshold(s) may be set via user interface 210. In some embodiments, two or more images that possess time proximity and at least a low visual similarity may be grouped. In some embodiments, two or more images that are determined to have a visual similarity above a "high" or a stricter threshold may be grouped together.

In some embodiments, the groups may be displayed in user interface 210. Once the groups are displayed in user interface 210 they may be modified. Modification may refer to alteration, adjustment, revision, or change. Group modification or alteration may include moving images from one group to another group, deleting images from a group, and splitting a group into two groups. In some other embodiments, the groups may be sent to stacking module 212 to create stacks based on the groups.

In some embodiments, system 200 may include stacking module 212. Stacking module 212 may create stacks based on the groups. As mentioned previously, creating a stack refers to the grouping of image files in a common holder represented by a single thumbnail. The stack may preserve the plurality of images without cluttering up the display window or user interface with multiple thumbnails. One image in the stack may be chosen as the stack representative. This representative image may be printed or used in a slide show by selecting the stack. That is, upon selecting the stack, the representative image is automatically selected. In some embodiments, the stack representative image may be selected by a user. In some embodiments, the stack representative image may be automatically selected. The resulting stacks may be displayed in user interface 210.

Figure 2B:
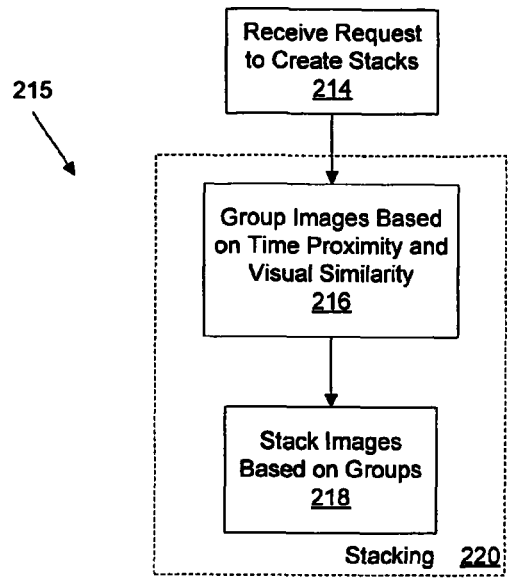
FIG. 2B illustrates an exemplary process for stacking images.

FIG. 2B illustrates an exemplary process 215 for stacking images. In process action 214 a request to create stacks may be received. In some embodiments, a request may be a message, command, or other input (e.g., user, system, default-specified, or other) that, when received, initiates or triggers a responsive action, message, command, action, or data to be sent. Here, a request may be provided by selecting a window control element such as a button. In some embodiments, a request may be triggered by downloading images from a digital image capturing device. In process action 216 the images in the display window, such as display window 100 in FIG. 1 may be grouped or sorted based on both time proximity and visual similarity. Time proximity may be determined by comparing the difference between the time stamps of two or more image files. If the time difference of the two or more image files is within a time threshold or range, the images may be considered to have time proximity. The time threshold may be preset, or in some embodiments, may be specified by the user. Determining the time proximity may be referred to as time analysis. Visual similarity may be determined by comparing the images of two or more image files. In some embodiments, visual similarity may be the measure of the degree of similarity between two or more images. Here, visual similarity may refer to having a likeness such that the images capture the same scene. In some embodiments, a threshold value may be used as the measure beyond which similarity may be achieved. In process action 218, the images may be stacked based on the groupings. In some embodiments, the process steps of grouping (process action 216) and stacking (process action 218) may be referred to as stacking, as represented by stacking process action 220.

Figure 2C:
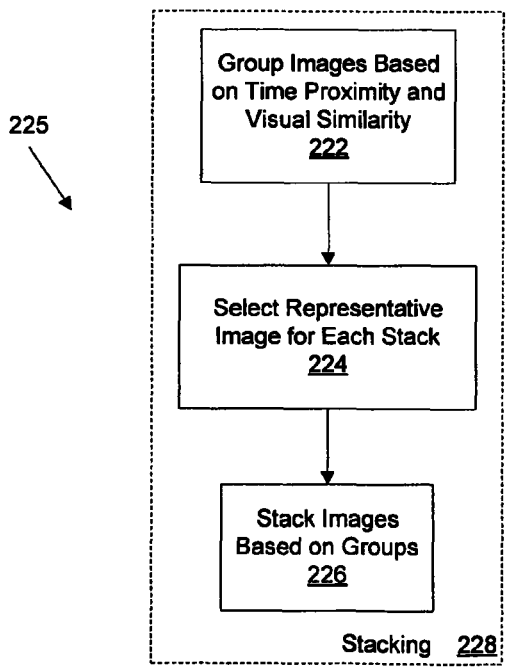
FIG. 2C illustrates an exemplary stacking process.

FIG. 2C illustrates an exemplary stacking process 225. In some embodiments, the stacking process may include automatically selecting a stack representative image. In process action 222 the images in the display window, such as display window 100 in FIG. 1 may be grouped or sorted based on both time proximity and visual similarity as described above for stacking process 220. In process action 224 a representative image may be selected for each created stack. In some embodiments, the selection of the stack representative may be manual. In some embodiments the selection of the stack representative may be automatic. In some embodiments, the automatic selection of the stack representative may be based on time. That is, the most recent or the least recent image may be selected as the stack representative image. In some embodiments, the automatic selection of the stack representative image may be based on image quality. Image quality may be referred to as image sharpness, or image crispness. The image sharpness may be measured and a selection made. In some embodiments, the automatic selection may be based on the image histogram. The image histogram may include the distribution of pixel values from light to dark. In process action 226, the images may be stacked based on the groupings with the selected stack representative image. Here, the process steps of grouping (process action 222), selecting a representative (process action 224) and stacking (process action 226) may be referred to as stacking as represented by stacking process action 228.

Figure 2D:
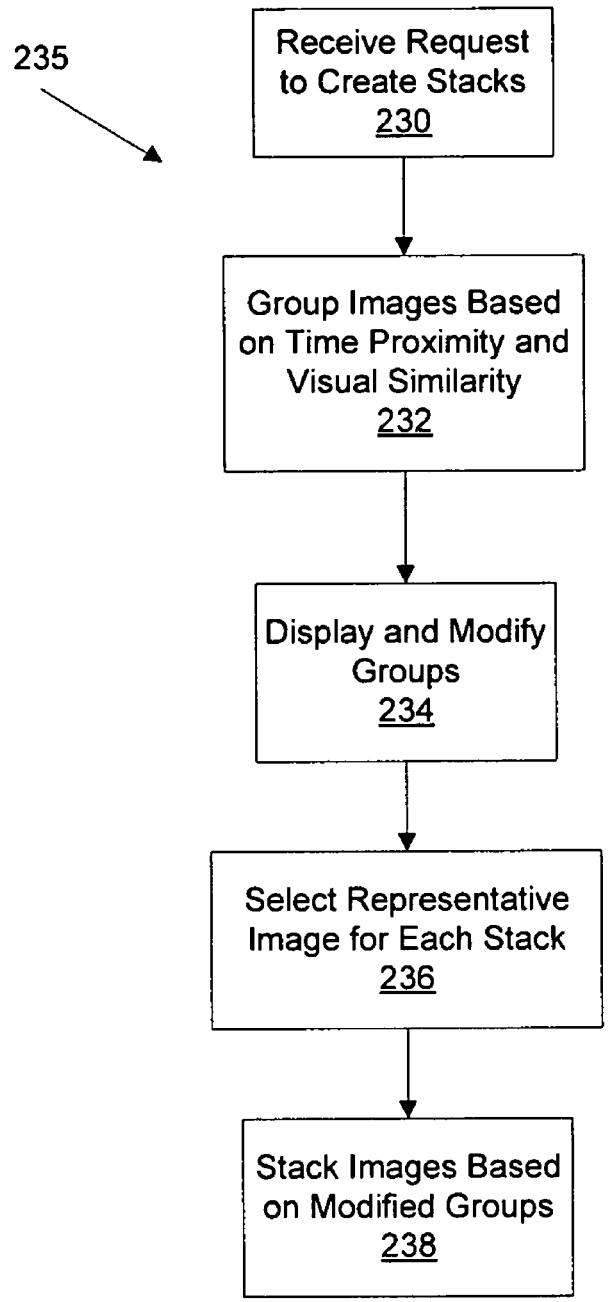
FIG. 2D illustrates an exemplary process for stacking images based on modified groups.

FIG. 2D illustrates an exemplary process 235 for stacking images based on modified groups. In process action 230 a request to create stacks may be received. In some embodiments, a request may be a message, command, or other input (e.g., user, system, default-specified, or other) that, when received, initiates or triggers a responsive action, message, command, action, or data to be sent. Here, a request may be provided by selecting a window control element such as a button. In some embodiments, a request may be triggered by downloading images from a digital image capturing device. In process action 232, the images in the display window, such as display window 100 in FIG. 1 may be grouped based on both time proximity and visual similarity. Time proximity may be determined by comparing the time stamps of two or more image files. If the time difference of the two or more image files is within a time threshold, the images are considered to have time proximity. The time threshold may be preset, or in some embodiments, may be specified by the user. Determining the time proximity may be referred to as time analysis. Visual similarity may be determined by comparing the images of two or more image files. In some embodiments, visual similarity may be the measure of the degree of similarity between two or more images. Here, visual similarity may refer to having a likeness such that the images capture the same scene. In some embodiments, a threshold value may be used as the measure beyond which similarity may be achieved. In process action 234, the groups may be displayed and modified. Modification of the groups may refer to any alteration, revision, or change to the groups. Group modification or alteration may include moving images from one group to another group, deleting images from a group, and splitting a group into two groups. In process action 236, the images may be stacked based on the modified groups. In some embodiments, an image to represent the stack may be automatically selected in process action 238. This selection process may be based on image quality as discussed in the description of grouping process 215.

Figure 2E:
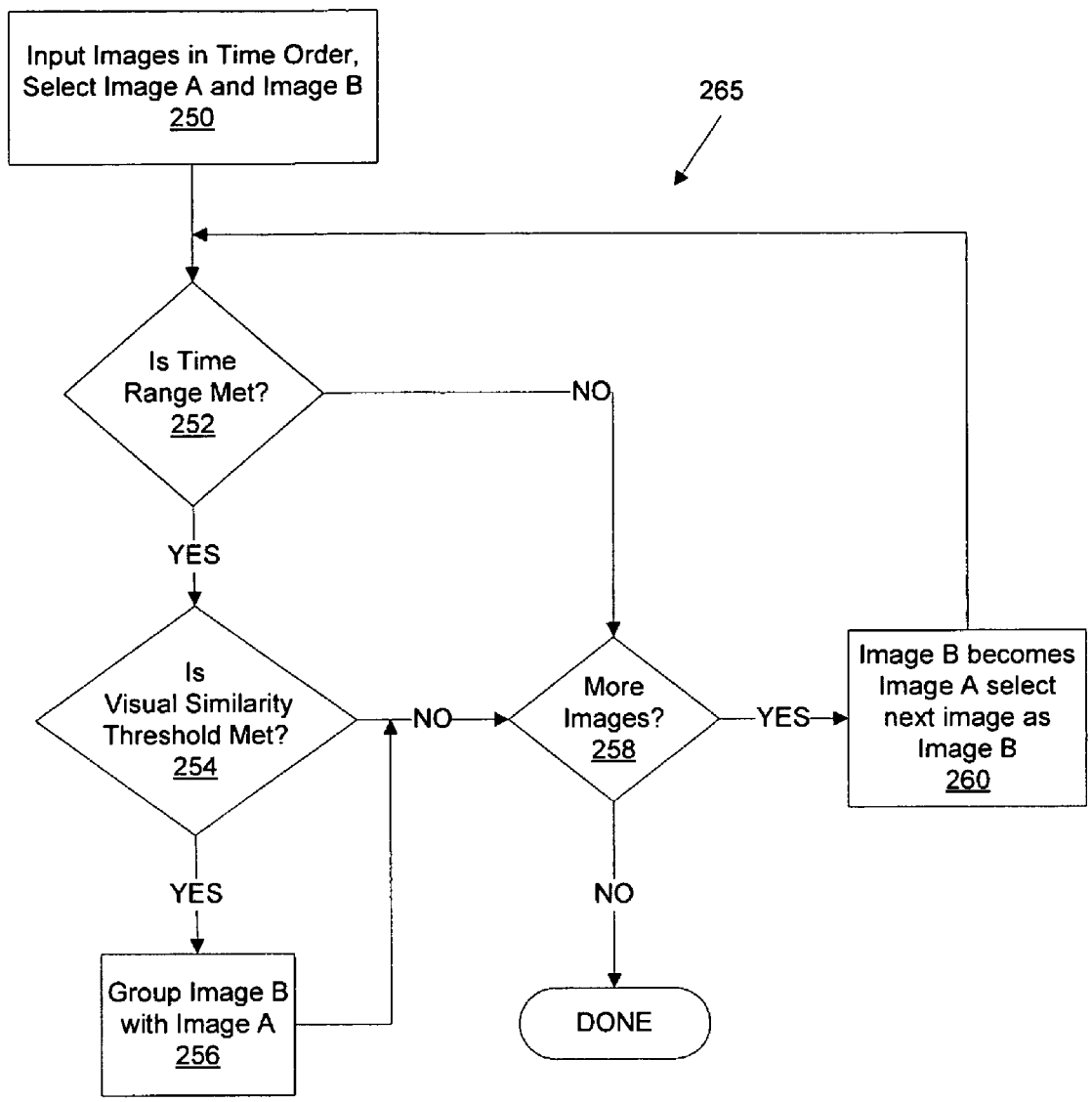
FIG. 2E illustrated an exemplary process for grouping images.

FIG. 2E illustrates an exemplary process 265 for grouping images. In process action 250, the images may be input into grouping module 202 of FIG. 2A in time order and two images, an image file A and an image file B, may be selected to begin the grouping process. Inputting may refer to any command or data entered into a computing device. Here, the images may be input into the grouping module by the selection of a window control element such as a button or menu item. For example, the image files represented by the thumbnails in a display window of an application may be input into the grouping module by the selection of a control element such as a "grouping" button or menu item. That is, the image files being displayed at the time the button is selected may be automatically input without having the user click on or highlight a thumbnail. In another embodiment, the input of the image files is triggered by the download from a digital image capturing device such as a digital camera. That is, the images files downloaded from a digital camera may be automatically input into the grouping module without the use of a window control element. Selecting images may refer to choosing, designating, or assigning images to undergo the grouping process. Each image file input into the grouping module may undergo the grouping process. In decision block 252, the grouping process determines if image file A and image file B are within the set time range. In other words, decision block 252 may determine if the difference in time between the time stamp of image A and the time stamp of image B is within the set time range. In some embodiments, the range may be set by the user. In other embodiments, a default value may be used. If the time difference is within the range, decision block 254 determines if the visual similarity of image A and image B is greater than or equal to the similarity threshold. In some embodiments, the similarity threshold may be set by the user via a user interface. In some implementations, the similarity threshold may be set by a percentage number entered by a user. In some implementations, the similarity threshold may be set by sliding a pointer in an analog slide bar, where the endpoints of the analog slide bar represent the endpoints of the acceptable range of threshold values and the position of the pointer within the bar determines the threshold value. In other implementations, a user may select a "high", "medium", or "low" or a "minimum" or "maximum" setting for similarity threshold. In yet other implementations, other means of a user determined threshold value may be utilized. For example, if a similarity threshold were set to a 72% similarity threshold value and the grouping module determined that the visual similarity of two images was 71%, the images may not be considered to have visual similarity. However, the images may be considered visual similar if the visual similarity was determined to be 72% or higher. In other embodiments, a default similarity threshold may be used. If the visual similarity threshold is exceeded, image B may be grouped with image A in process action 256. The grouping process may group image files that have both time proximity and visual similarity. In some embodiments, images may be grouped upon possessing time proximity and at least a low to medium visual similarity. Decision block 258 determines if there are more images to group. If yes, image B becomes image A and the next image in time order may be selected as image B in process action 260. The new image A and image B are compared in both time proximity and visual similarity as previously described. This process may be continued until the remaining images are grouped. When there are no more images to compare, i.e., no more images to group, the process may be complete. The grouping process may result in one or more groups, each group containing one or more images.

Figure 2F:
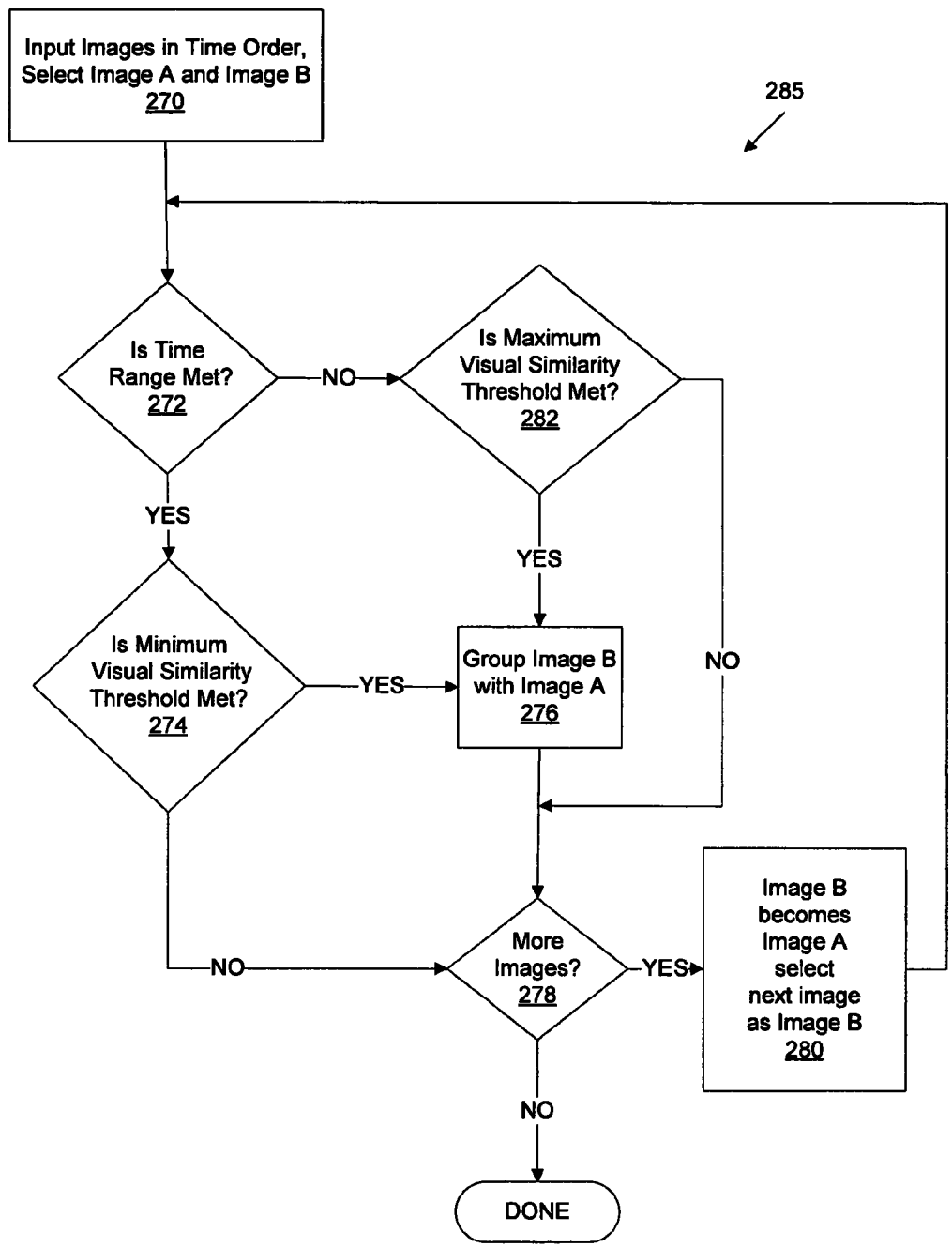
FIG. 2F illustrates an exemplary process for grouping images.

FIG. 2F illustrates an exemplary process 285 for grouping images. In some embodiments images may be grouped by possessing both time proximity and visual similarity. In some embodiments images may be grouped by possessing a stricter or higher level of visual similarity. For example, in process action 270 the images may be input in time order, the most recent image is selected as image A, and the second most recent image is selected as image B. In decision block 272, grouping process determines if image file A and image file B are within the set time range. In other words, decision block 272 may determine if the difference in time between the time stamp of image A and the time stamp of image B is within the set time range. In some embodiments, the range may be set by the user. In other embodiments, a default value may be used. If the time difference is within the range, process 285 may flow to decision block 274. Decision block 274 may determine if the visual similarity of image A and image B is greater than or equal to the minimum similarity threshold. In some embodiments, the similarity threshold may be set by the user via a user interface. In some implementations, the similarity threshold may be set by a percentage number entered by a user. In some implementations, the similarity threshold may be set by sliding a pointer in an analog slide bar, where the endpoints of the analog slide bar represent the endpoints of the acceptable range of threshold values and the position of the pointer within the bar determines the threshold value. In other implementations, a user may select a "high", "medium", or "low" threshold. In yet other implementations, other means of a user determined threshold value may be utilized. If the visual similarity of image A and image B meets the minimum similarity threshold, then process action 276 may group image B with image A. If the minimum visual similarity threshold is not met, grouping may not occur. Decision block 278 may determine if there are more images to group. If there are more images to group, then image B may become image A and the next image in time order may be selected as image B in process action 280. The new image A and image B go through the grouping process 285 as described above.

If decision block 272 determines that the time range has not been met, then decision block 282 determines if the visual similarity of image A and image B has met a maximum similarity threshold. If the maximum visual similarity is met, process action 276 may group the images. If the maximum, or stricter, similarity threshold is not met, then no grouping occurs. Process 285 flows to decision block 278 where it may be determined if there are more images to group. If there are more images, image B may become image A and the next image in time order becomes image B in process action 280. Then process 285 compares the new image A and image B as described above. The maximum similarity threshold may be stricter than, more stringent than, or greater than the minimum similarity threshold. That is, if the images do not possess time proximity, process 285 allows for a more stringent visual similarity requirement to group the images. In other words, the maximum similarity threshold requires a higher degree of similarity than the minimum similarity threshold. For example, the minimum visual similarity threshold may be 70% similarity and the maximum similarity threshold may be 80%. With these settings, process 285 may group some images that have time proximity and have a visual similarity of at least 70%. Process 285 may also group images that do not have time proximity but do have a visual similarity of 80% or more.

FIG. 3A illustrates an exemplary user interface displaying image groupings formed during the grouping process. For example, if image files (i.e., image 1 through image 24) shown in FIG. 1 went through grouping process 265 in FIG. 2E, the groupings in FIG. 3A may be the result. Image files image 1 through image 7 may be grouped together in grouping 302. Image files image 8 through image 14 may be grouped together in grouping 304. Image files image 15 through image 17 may be grouped together in grouping 306. Image files image 18 through image 21 may be grouped together in grouping 308. Image files image 22 through image 24 may be grouped together in grouping 310. Some example groupings may include: a sunset in which the exposure setting may be manually adjusted may be grouped; a regatta in which images of the same sailboat is captured at several points in the race, the sailboat images at each point or as a whole may be grouped; images captured during burst-mode of a digital camera such as at a sporting event, (e.g., a boxing match, a football game), may be grouped, and other grouping scenarios. These are example groupings, the actual groupings may depend on actual time proximity and visual similarity.

The groupings created by the grouping process may, in some embodiments, be modified by a user. The modifications may include splitting a group into two groups, moving images from one group to another group, and deleting images from a group.

Figure 3B:
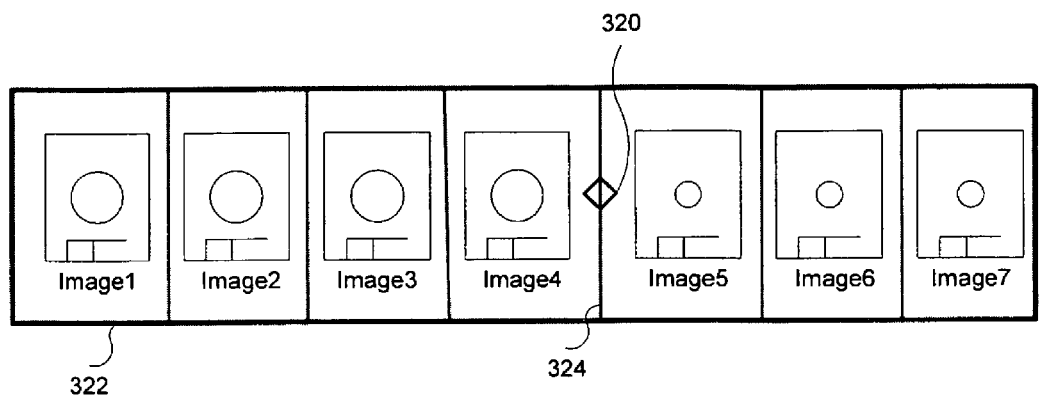
FIG. 3B illustrates an exemplary group splitting feature.

FIG. 3B illustrates an exemplary group splitting feature, in accordance with an embodiment. Group 322 shows image files image 1 through image 7. Separation lines, such as separation line 324, may separate an image file from a subsequent image file. Splitting pointer 320 may be positioned on top of or above the separation line 324. Upon the selection of a separation line with the splitting pointer, the group may be split with the images to the right of the separation line being grouped in a new group and the image files to the left of the separation line remaining in the original group. Selection of the separation line may be implemented using a mouse click or, a keyboard stroke, or other input devices. The implementation of the group splitting may be implemented in other embodiments as well.

Figure 3C:
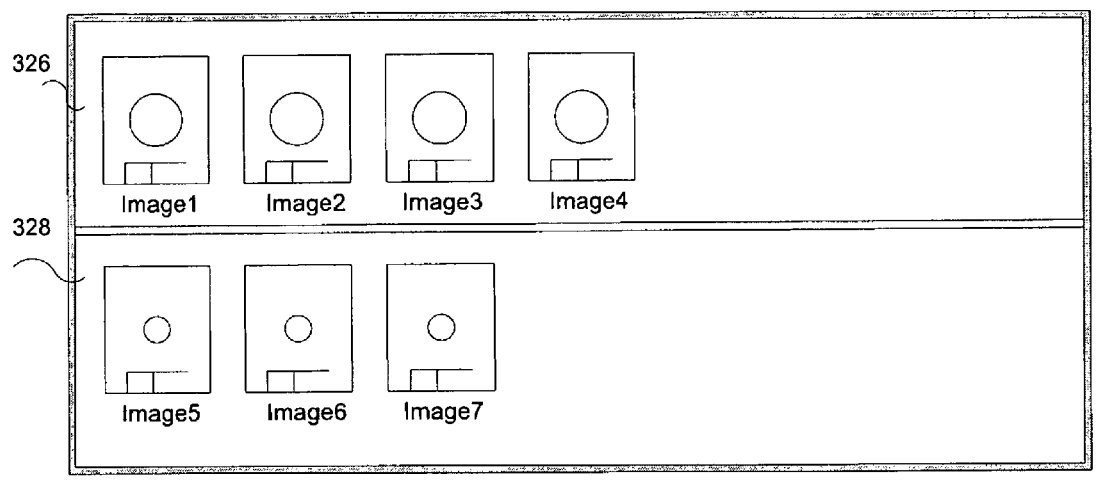
FIG. 3C illustrates exemplary split groupings.

FIG. 3C illustrates exemplary split groupings, in accordance with an embodiment. In some embodiments, new groups 326 and 328 may have resulted from the splitting process described in reference to FIG. 3B. Group 326 may include the image file to the left of selected separation line 324, image 1 through image 4. Group 328 may include the image files to the right of selected separation line 324, image 5 through image 7.

Figure 3D:
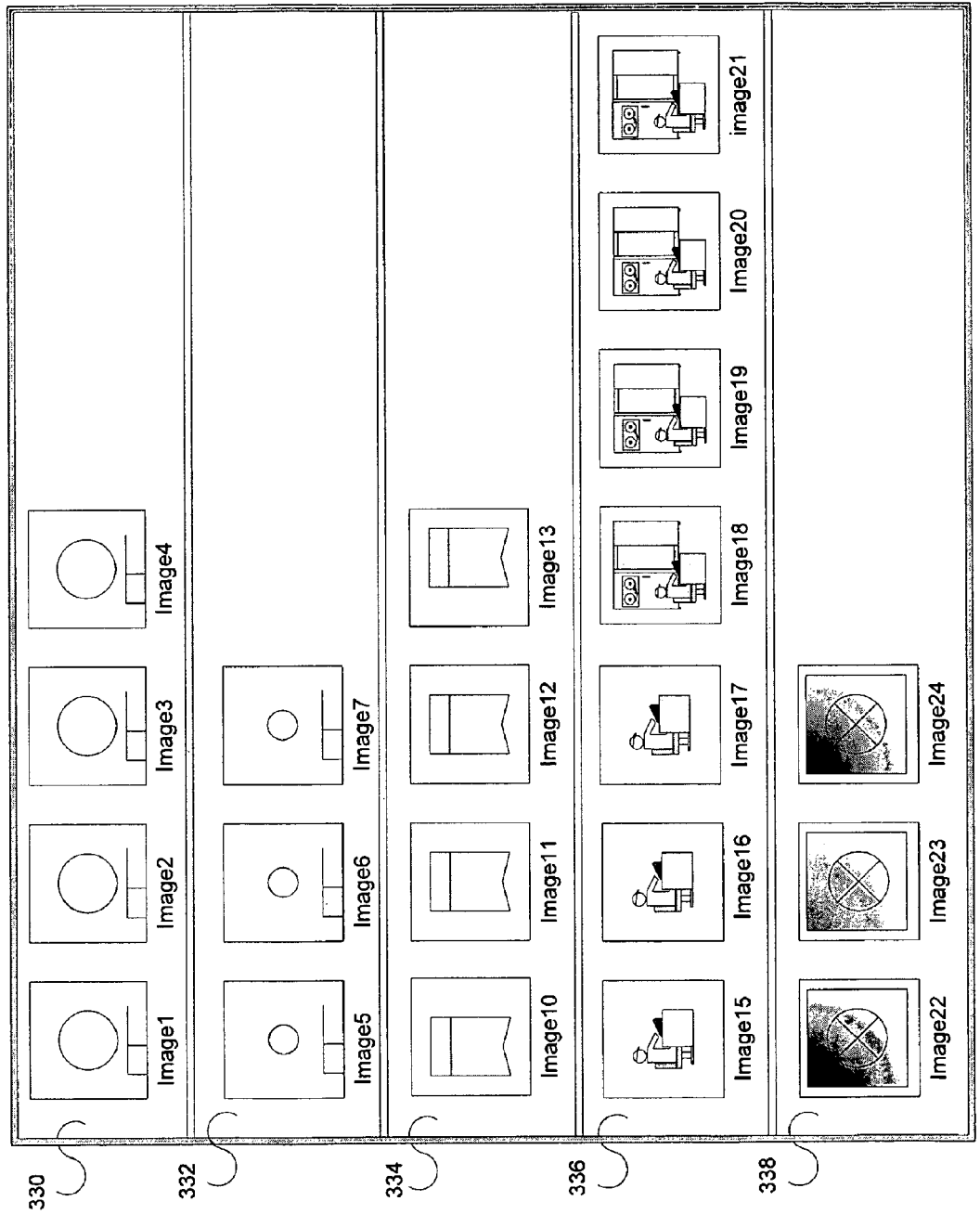
FIG. 3D illustrates an exemplary user interface displaying altered groupings.

FIG. 3D illustrates an exemplary user interface displaying altered groupings, in accordance with an embodiment. Groups 330 and 332 may show split groups as discussed with regard to FIG. 3B and FIG. 3C. Group 334 may relate to group 304 in FIG. 3A. Image files image 8, image 9, and image 14 may have been deleted from group 304 to create group 334. Deletion may include an image file selection followed by a deletion command. In some embodiments, the selection may be implemented using a mouse click or keyboard stroke. In some embodiments, the deletion command may be implemented using a control element such as a button or a menu item selection.

In an example, group 336 in FIG. 3D may relate to groups 306 and 308 in FIG. 3A. For example, image files image 15 through image 17 may be grouped in group 306 by the grouping process. Image files image 18 through image 21 may be grouped in group 308 by the grouping process. A user may desire to place the images together, if, for example, the same person existed in all the images. Group 336 shows the resulting group after moving the images into one group. The moving function may be implemented by selecting the image files it is desired to move and inserting them into the desired group. In some embodiments, a mouse may be used for inserting. For example, if implemented using mouse inputs, the user may select by highlighting (i.e., holding down the left mouse button and dragging the mouse) the image files. The user may insert by dragging the highlighted image files to the new group and releasing the highlighted images (click and hold onto the highlighted images with the left mouse button, drag to the new group, release the left mouse button). In some embodiments, a keyboard may be used. In other embodiments both the mouse and keyboard methods may be implemented. Other user input methods may be implemented as well. Group 338 in FIG. 3D may relate to group 310 in FIG. 3A. Here, no modifications have been performed on this group. Image files image 22 through image 24 may be included in the groups.

Figure 4:
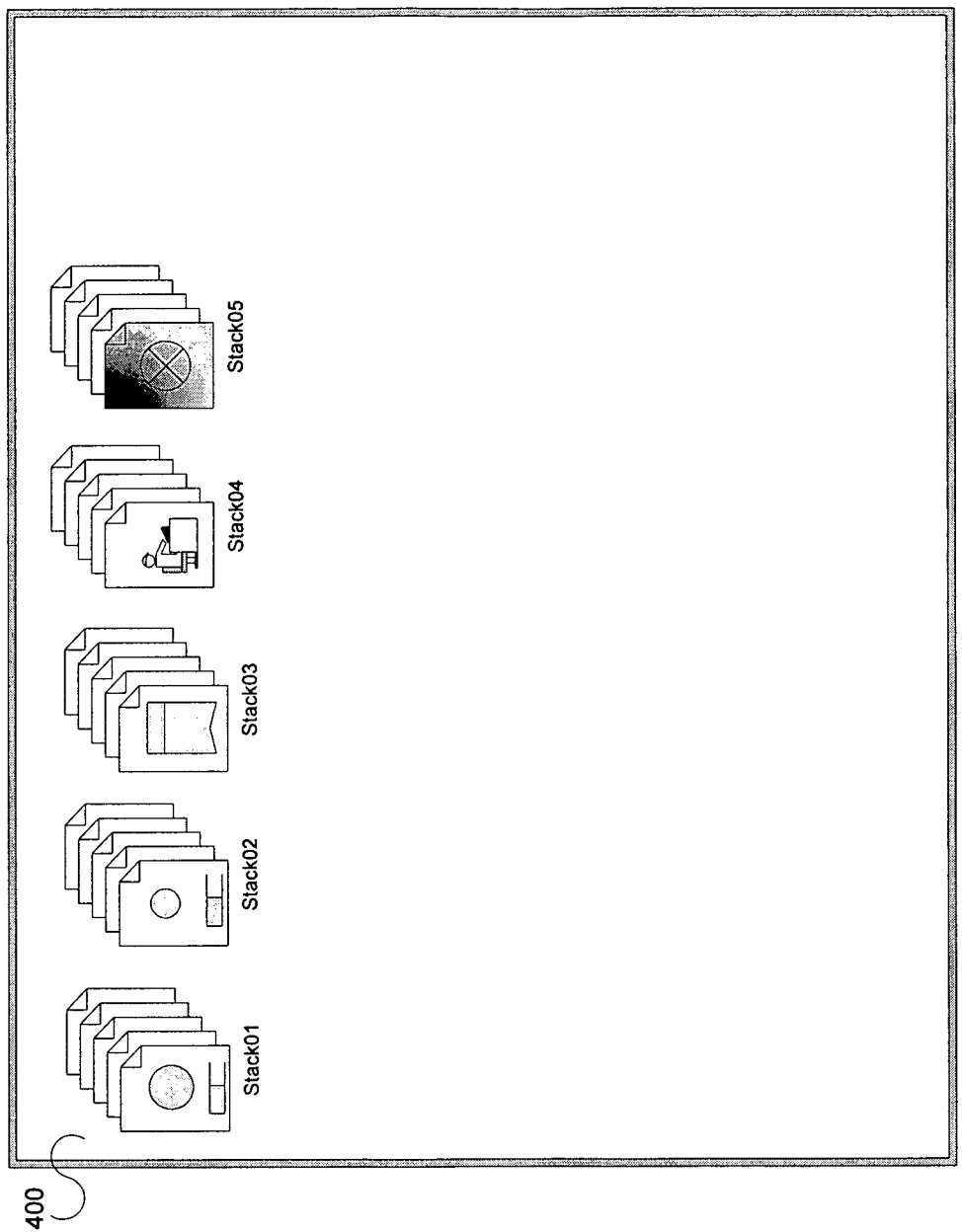
FIG. 4 illustrates an exemplary user interface displaying stacks.

FIG. 4 illustrates an exemplary user interface displaying stacks. Stacks 01 through stack 05 may be created based on groups 330 through 338 in FIG. 3D. Group 330 may be used to create stack 01. Image file image 1 may be the first image stored in group 330. Image file image 1 may be used as the representative image of stack 01 and may be shown as the thumbnail of stack 01. Image files image 2 through image 4 may also be stored within stack 01. The thumbnails for image 2 through image 4 may be visible by opening stack 01. Group 332 may be used to create stack 02. Image file image 5 may be the first image stored in group 332. Image file image 5 may be used as the representative image of stack 02 and may be shown as the thumbnail of stack 02. Image files image 6 through image 7 may be stored within stack 02. The thumbnails for images image 6 through image 7 may be visible by opening stack 02. Group 334 may be used to create stack 03. Image file image 10 may be the first image stored in group 334. Image file image 10 may be used as the representative image of stack 03 and may be shown as the thumbnail of stack 03. Image files image 11 through image 13 may be stored within stack 03. The thumbnails for images image 11 through image 13 may be visible by opening stack 03. Group 336 may be used to create stack 04. Image file image 15 may be the first image stored in group 336. Image file image 15 may be used as the representative image of stack 04 and may be shown as the thumbnail of stack 04. Image files image 16 through image 21 may be stored within stack 04. The thumbnails for images image 16 through image 21 may be visible by opening stack 04. Group 338 may be used to create stack 05. Image file image 22 may be the first image stored in group 338. Image file image 22 may be used as the representative image of stack 05 and may be shown as the thumbnail of stack 05. Image files image 23 through image 24 may also be stored within stack 05. The thumbnails for images image 23 through image 24 may be visible by opening stack 05.

Figure 5:
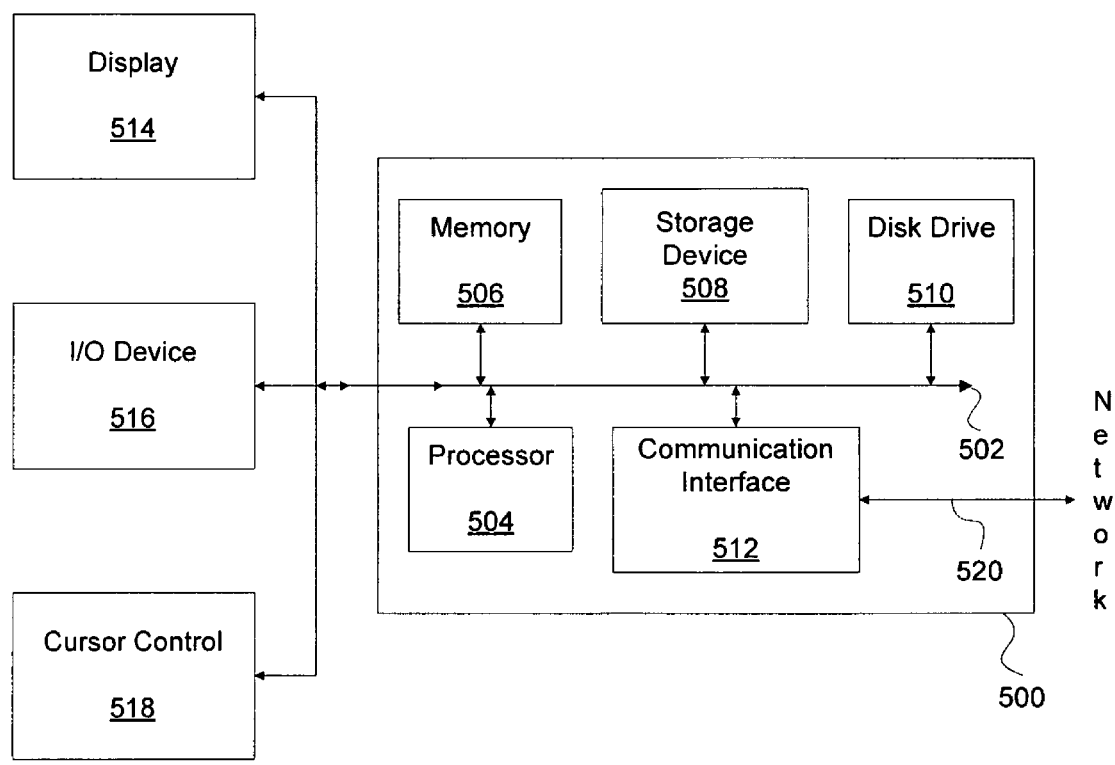
FIG. 5 is a block diagram illustrating an exemplary computer system suitable for stacking images.

FIG. 5 is a block diagram illustrating an exemplary computer system suitable for stacking images, in accordance with an embodiment. In some embodiments, computer system 500 may be used to implement computer programs, applications, methods, or other software to perform the above-described techniques for fabricating storage systems such as those described above. Computer system 500 includes a bus 502 or other communication mechanism for communicating information, which interconnects subsystems and devices, such as processor 504, system memory 506 (e.g., RAM), storage device 508 (e.g., ROM), disk drive 510 (e.g., magnetic or optical), communication interface 512 (e.g., modem or Ethernet card), display 514 (e.g., CRT or LCD), input device 516 (e.g., keyboard), and cursor control 518 (e.g., mouse or trackball).

According to some embodiments of the invention, computer system 500 performs specific operations by processor 504 executing one or more sequences of one or more instructions stored in system memory 506. Such instructions may be read into system memory 506 from another computer readable medium, such as static storage device 508 or disk drive 510. In some embodiments, hard-wired circuitry may be used in place of or in combination with software instructions to implement the invention.

The term "computer readable medium" refers to any medium that participates in providing instructions to processor 504 for execution. Such a medium may take many forms, including but not limited to, non-volatile media, volatile media, and transmission media. Non-volatile media includes, for example, optical or magnetic disks, such as disk drive 510. Volatile media includes dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some embodiments of the invention, execution of the sequences of instructions to practice the invention is performed by a single computer system 500. According to some embodiments of the invention, two or more computer systems 500 coupled by communication link 520 (e.g., LAN, PSTN, or wireless network) may perform the sequence of instructions to practice the invention in coordination with one another. Computer system 500 may transmit and receive messages, data, and instructions, including program, i.e., application code, through communication link 520 and communication interface 512. Received program code may be executed by processor 504 as it is received, and/or stored in disk drive 510, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method, comprising:
   receiving electronic images that are each a separate image file;
   determining one or more groupings of the electronic images based on a time proximity and a visual similarity of the electronic images, the time proximity indicating whether respective capture times for two or more of the electronic images are within a range of time, the one or more groupings being determined based on whether the visual similarity satisfies a visual similarity threshold that is selected based on the time proximity; and
   creating one or more stacks of the electronic images based on the one or more groupings, each stack comprising a single representative image chosen to represent the stack, each stack displayable to include the respective single representative image for the stack and a visual indication that the respective single representative image represents the stack of the electronic images.

2. The method of claim 1, wherein receiving the electronic images further comprises automatically selecting the electronic images.

3. The method of claim 2, wherein automatically selecting the electronic images further comprises automatically selecting the electronic images on display in a user interface.

4. The method of claim 2, wherein the automatically selecting the electronic images is triggered by a download of electronic images from an image capturing device.

5. The method of claim 1, further comprising editing the one or more groupings for the electronic images upon receipt of an editing command.

6. The method of claim 1, wherein determining the one or more groupings of the electronic images based on the time proximity and the visual similarity further comprises grouping the electronic images based on a time stamp being within a time proximity range and the visual similarity being greater than or equal to a first similarity threshold.

7. The method of claim 6, wherein determining the one or more groupings of the electronic images based on the time proximity and the visual similarity further comprises grouping the electronic images based on the time stamp being outside of the time proximity range and the visual similarity being greater than a second similarity threshold, the second similarity threshold being greater than the first similarity threshold.

8. The method of claim 1, wherein determining the one or more groupings of the electronic images based on the time proximity and the visual similarity further comprises comparing the time proximity and the visual similarity between two of the electronic images.

9. The method of claim 1, wherein determining the one or more groupings for of the electronic images based on the time proximity and the visual similarity further comprises comparing the time proximity and the visual similarity between one of the electronic images and a grouping of the electronic images.

10. The method of claim 1, wherein creating one or more stacks of the electronic images further comprises selecting one of the electronic images in a respective stack as the representative image for the respective stack.

11. A system, comprising:
    a processor; and
    a memory coupled to the processor and configured to store program instructions executable by the processor to implement:
       a visual similarity engine configured to analyze a visual similarity of digital images that are each a separate digital image file;
       a time analyzer configured to analyze a time proximity of the digital images and indicate whether respective capture times for two or more of the digital images are within a certain range of time;
       a grouping module configured to sort the digital images into one or more groups based on the visual similarity and the time proximity, the one or more groups based on whether the visual similarity satisfies a visual similarity threshold that is selected based on the time proximity;

a stacking module configured to create one or more stacks of digital images based on the one or more groups, each stack comprising a single representative image chosen to represent the stack; and a user interface configured to display the one or more stacks of digital images, each stack displayable to include the respective single representative image for the stack and a visual indication that the respective single representative image represents the stack of the digital images.

12. The system of claim 11, wherein the grouping module is further configured to edit one of the one or more groups based on commands received from the user interface.

13. The system of claim 11, wherein the grouping module is further configured to group two or more of the digital images that possess a time proximity within a time range and a visual similarity greater than or equal to a first visual similarity threshold.

14. The system of claim 13, wherein the grouping module is further configured to group two or more of the digital images that possess a time proximity outside the time range and a visual similarity greater than or equal to a second visual similarity threshold, the second similarity threshold being higher than the first visual similarity threshold.

15. The system of claim 11, wherein the stacking module is further configured to select one of the digital images in a respective stack as the single representative image for the respective stack, the selection based on digital image quality.

16. The system of claim 11, wherein the visual similarity engine and the time analyzer are further configured to perform the analyzing automatically upon a download of digital images from an image capturing device.

17. One or more computer readable storage devices comprising computer instructions that, responsive to execution by a computer, cause the computer to perform operations including:

receiving electronic images that are each a separate image file;

determining one or more groupings associated with the electronic images based on a time proximity and a visual similarity of the electronic images, the time proximity indicating whether respective capture times for two or more of the electronic images are within a certain range of time, the one or more groupings being determined based on whether the visual similarity satisfies a visual similarity threshold that is selected based on the time proximity; and creating one or more stacks for the electronic images based on the one or more groupings, each stack comprising a single representative image chosen to represent the stack, each stack displayable to include the respective single representative image for the stack and a visual indication that the respective single representative image represents the stack of the electronic images.

18. One or more computer readable storage devices as described in claim 17, wherein the operations further comprise selecting the respective single representative image for the stack, wherein the selecting is based on image quality.

19. One or more computer readable storage devices as described in claim 17, wherein the operations further comprise selecting at least one of the one or more stacks to perform an action using images in the at least one of the one or more stacks as a subject of the action.

20. One or more computer readable storage devices as described in claim 19, wherein the action is performed on only the single representative image chosen to represent the stack.

* * * * *